US008948773B2

(12) United States Patent
Jung et al.

(10) Patent No.: US 8,948,773 B2
(45) Date of Patent: Feb. 3, 2015

(54) METHOD AND APPARATUS FOR MANAGING ACTIVE SET IN A MOBILE COMMUNICATION SYSTEM

(75) Inventors: Jung-Soo Jung, Seongnam-si (KR);
Dae-Gyun Kim, Seongnam-si (KR);
Beom-Sik Bae, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 1444 days.

(21) Appl. No.: 12/108,912

(22) Filed: Apr. 24, 2008

(65) Prior Publication Data
US 2008/0268889 A1    Oct. 30, 2008

(30) Foreign Application Priority Data

Apr. 24, 2007  (KR) .......................... 10-2007-0040091

(51) Int. Cl.
*H04W 72/00* (2009.01)
*H04W 48/08* (2009.01)
*H04W 24/00* (2009.01)
*H04W 48/16* (2009.01)

(52) U.S. Cl.
CPC .............. *H04W 48/08* (2013.01); *H04W 24/00* (2013.01); *H04W 48/16* (2013.01)
USPC ...................... 455/452.2; 455/422.1; 455/423; 455/515

(58) Field of Classification Search
USPC ........................... 455/422.1, 423, 452.2, 515
See application file for complete search history.

(56) References Cited

U.S. PATENT DOCUMENTS

| 2002/0111158 | A1 | 8/2002 | Tee |
| 2004/0203838 | A1 | 10/2004 | Joshi et al. |
| 2004/0229618 | A1 | 11/2004 | Adatrao et al. |
| 2007/0123262 | A1* | 5/2007 | Proctor .......................... 455/442 |
| 2008/0207245 | A1* | 8/2008 | Wakabayashi et al. ........ 455/522 |

FOREIGN PATENT DOCUMENTS

| EP | 1 049 349 | 11/2000 |
| KR | 1020050085365 | 8/2005 |

* cited by examiner

*Primary Examiner* — Justin Lee
(74) *Attorney, Agent, or Firm* — The Farrell Law Firm, P.C.

(57) ABSTRACT

A method is provided for managing active sets of a terminal that receives a pilot channel from a base station in a mobile communication system. Reception strength of the pilot channel is measured. It is checked whether the number of active sets being managed by the terminal is greater than or equal to the predetermined maximum number of supportable active sets. It is determined whether to transmit a pilot to the base station according to the checking result.

14 Claims, 3 Drawing Sheets

METHOD AND APPARATUS FOR MANAGING ACTIVE SET IN A MOBILE COMMUNICATION SYSTEM

PRIORITY

This application claims priority 35 U.S.C. §119(a) to a Korean Patent Application filed in the Korean Intellectual Property Office on Apr. 24, 2007 and assigned Serial No. 2007-40091, the disclosure of which is incorporated herein by reference.

BACKGROUND OF THE INVENTION

1. Field of the Invention

The present invention relates generally to a mobile communication system, and more particularly, to a method and apparatus for managing active sets of a terminal.

2. Description of the Related Art

Recently, in wireless communication systems, a distributed network structure and/or a flat network structure have been proposed, extensions of which are easier. Generally, the distributed network structure is composed of a base station(s) and a gateway. The distributed network structure has a simpler structure than the conventional wireless communication system, which is composed of a base station, a data controller and a gateway.

FIG. 1 is a diagram illustrating an example of a general distributed network structure.

Referring to FIG. 1, the general distributed network structure includes a gateway 101 for connecting a radio access network to an external network, base stations 102, 103 of the radio access network, and a wireless terminal 104.

The distributed network structure is characterized in that many control functions located in the conventional data controller are included in the base stations or the gateway. In addition, the distributed network structure, unlike the conventional network structure, allows more independence between base station nodes. That is, the distributed network structure allows the base stations to independently manage their own resources, and also allows the base stations having different protocol versions or communication setups to coexist in one system. In an example of FIG. 1, base station 102 and base station 103 can be different in the protocol version used for wireless access. In addition, the two base stations can allocate resources to one terminal independently of each other, or can exchange control messages with the terminal independently.

Further, the distributed network structure allows most terminal-related information to be stored and managed independently in each base station. Moreover, the distributed network structure assumes that the base stations can independently allocate and withdraw resources to/from a terminal. For example, when there are two base stations, base station A and base station B, base station A can independently allocate wireless resources to a particular terminal regardless of which wireless resources base station B has allocated to the particular terminal. In the distributed network structure, a terminal should transmit reception strength information of a pilot channel to base stations A and B independently in order to support independent resource management of each base station.

When different base stations allocate resources independently in this way, there is a possible problem that a sum of the number of resources allocated by each base station exceeds the number of resources manageable by the terminal. For example, in the case where the number of active sets supportable by a terminal is 3 (i.e., the terminal can receive wireless resources allocated in a total of 3 sectors), if base stations A and B each allocate wireless resources for two sectors therein to the terminal, the number of resources allocated to the terminal, i.e., the number of active sets, is 2 in each base station, which is less than the maximum number of active sets supportable by the terminal. However, when the numbers of resources allocated in all base stations are summed, if the number of active sets is 4, it may exceed the maximum number of active sets supportable by the terminal. That is, as different base stations independently allocate resources, the number of active sets manageable by one terminal may exceed the maximum number of active sets supportable by the terminal, so that the active sets manageable by the terminal may be allocated abnormally.

Therefore, there is a demand for a method and apparatus in which a terminal of a mobile communication system can efficiently manage active sets.

SUMMARY OF THE INVENTION

The present invention has been made to address at least the above problems and/or disadvantages and to provide at least the advantages described below. Accordingly, an aspect of the present invention provides a method and apparatus capable of efficiently managing active sets of a terminal in a mobile communication system.

Another aspect of the present invention provides a method and apparatus capable of efficiently managing active sets of a terminal when each base station independently allocates and manages wireless resources in a mobile communication system.

An additional aspect of the present invention provides a method and apparatus capable of efficiently managing active sets of a terminal when each base station independently allocates and manages wireless resources to a terminal in a distributed network or flat network structure.

A further aspect of the present invention provides a method and apparatus for efficiently allocating wireless resources to a terminal using a pilot report of the terminal, which is information used for determining whether to allocate resources, when base stations allocate wireless resources to the terminal.

According to one aspect of the present invention, a method for managing active sets of a terminal is provided that receives a pilot channel from a base station in a mobile communication system. Reception strength of the pilot channel is measured. It is checked whether the number of active sets being managed by the terminal is greater than or equal to the predetermined maximum number of supportable active sets. It is determined whether to transmit a pilot to the base station according to the checking result.

According to another aspect of the present invention, an apparatus is provided for managing active sets of a terminal in a mobile communication system. The apparatus includes a front end for receiving a pilot channel from a base station, and for measuring reception strength of the pilot channel. The apparatus also includes a controller for checking whether the number of active sets being managed by the terminal is greater than or equal to the predetermined maximum number of supportable active sets, and for determining whether to transmit a pilot to the base station according to the checking result.

BRIEF DESCRIPTION OF THE DRAWINGS

The above and other aspects, features and advantages of the present invention will become more apparent from the fol

DETAILED DESCRIPTION OF THE PREFERRED EMBODIMENTS

Figure 1:
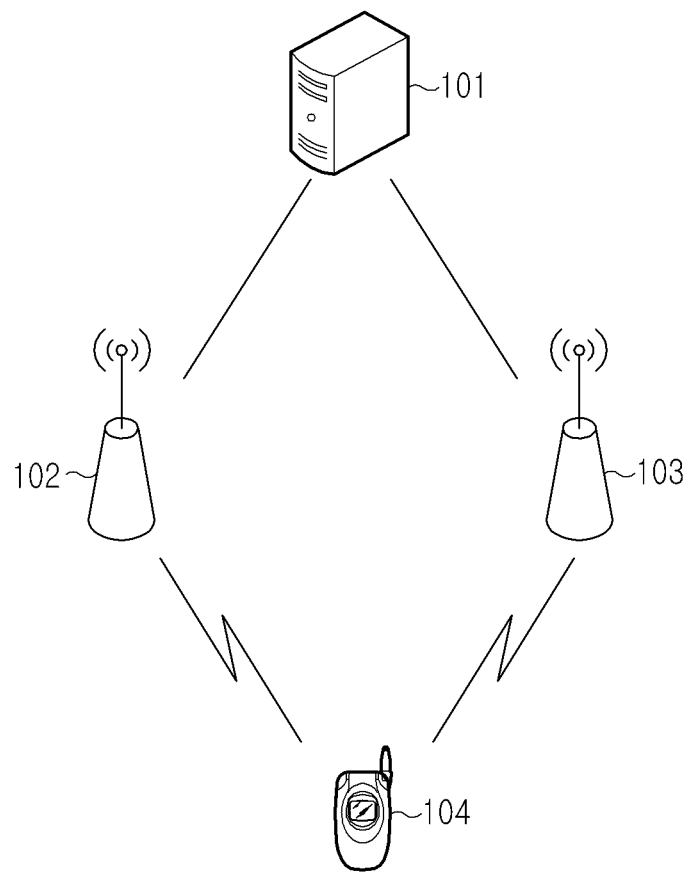
- FIG. 1 is a diagram illustrating an example of a general distributed network structure.

Preferred embodiments of the present invention are described in detail with reference to the annexed drawings. Detailed descriptions of constructions or processes known in the art may be omitted to avoid obscuring the subject matter of the present invention.

It is assumed herein that each base station independently allocates and withdraws resources to/from a terminal, and it is also assumed that each base station independently manages active sets for a particular terminal. Further, it is assumed herein that a terminal collectively manages all active sets allocated to the terminal itself. For example, when a base station A has allocated resources to a particular terminal in its two sectors, base station A manages two active set pilots for the corresponding terminal. When a base station B also has allocated resources to the terminal in one sector, base station B manages one active set pilot for the corresponding terminal. The terminal collectively manages all three active set pilots allocated from base station A and base station B.

However, when different base stations independently allocate resources, there is a possible problem in that the sum of the numbers of resources allocated by each base station may exceed the number of resources manageable by a terminal. Generally, the base station determines whether to allocate resources to a terminal in a particular sector using strength information of a pilot transmitted by the terminal. Therefore, an embodiment of the present invention proposes a method and apparatus for controlling the time that a terminal transmits pilot strength information, thereby preventing different base stations from allocating resources, the number of which exceeds the number of resources supportable by the terminal.

The base station used herein is assumed to include one or more sectors or cover one cell, and the term 'the number of active sets' means the number of base stations or sectors included in the active sets, and is also called 'active set size'. For convenience, it will be assumed herein that each base station manages two sectors.

1) When the current number of active sets managed by a terminal is greater than or equal to the maximum number of active sets supportable by the terminal, an embodiment of the present invention prevents the terminal from transmitting a pilot report message even though reception strength of a pilot channel not included in active sets is greater than or equal to particular strength. That is, when the number of active sets of the terminal is greater than or equal to the maximum number of active sets, the terminal transmits no pilot report message, thereby preventing additional resource allocation from the base station. In addition, when the number of active sets of the terminal is greater than or equal to the maximum number of active sets, even though there is a base station or a sector having a pilot with a reception strength high enough for wireless resource allocation, the terminal transmits no pilot report message to the corresponding base station or sector. Therefore, the corresponding base station or sector performs no additional resource allocation since there is no pilot report message received from the terminal.

2) In the case where the current number of active sets managed by a terminal is greater than or equal to the maximum number of active sets supportable by the terminal, when reception strength of a pilot channel included in active sets has dropped below particular strength, an embodiment of the present invention allows the terminal to send a resource withdrawal request to the corresponding base station or sector, and to transmit a pilot report message to receive resources allocated from a new base station.

3) When the number of active sets of a terminal is greater than or equal to the maximum number of active sets supportable by the terminal in the state where it was previously less than the maximum number of active sets supportable by the terminal, an embodiment of the allows the terminal to transmit a pilot report message. When the terminal cannot support any more allocated resources as it is allocated resources from a particular base station, the terminal provides this information to base stations included in the active sets or adjacent base stations to prevent any more unnecessary resource allocation.

4) When the number of active sets of a terminal is less than the maximum number of active sets supportable by the terminal in the state where it was previously greater than or equal to the maximum number of active sets supportable by the terminal, an embodiments of the present invention allows the terminal to transmit a pilot report message. When a connection to a particular base station or sector included in active sets of the terminal is disconnected or the terminal has lost the connection due to supervision failure, the terminal provides this information to other base stations or sectors to receive additional resources allocated therefrom.

On the other hand, the base station, which has received a pilot report message transmitted by the terminal, can allocate wire/wireless resources to the corresponding terminal in the sectors from which a pilot is received at the corresponding terminal with particular strength or higher. For example, when the terminal has received pilot channels transmitted from two sectors of a particular base station with sufficient strength, the base station can allocate resources for the corresponding terminal in the two sectors. However, if the terminal can support only one more sector in addition to the current number of active sets, there is a problem that the terminal may not support all resources of two sectors, allocated by the base station. In order to address this problem, according to an embodiment of the present invention, the terminal, when reporting reception strength of a pilot channel to the base station, reports reception strength information of each pilot channel along with information on the number of its currently managed active sets or information on the number of additionally supportable active sets. The base station, which has received a pilot report message of a terminal, can determine how many additional resources the terminal can support, thereby preventing unnecessary resource allocation problem.

When the terminal has transmitted pilot report messages to a plurality of base stations and the base stations independently allocate resources, since each base station cannot immediately determine how many resources other base stations have allocated, there is a possible case where the base station may allocate resources, the number of which is greater than or equal to the number of resources supportable by the terminal. For example, when the terminal has received pilot channels transmitted from two sectors of two base stations with sufficient strength and has transmitted pilot reports thereon to the two base stations, the two base stations can allocate resources for the corresponding terminal in each sector. However, if the terminal can support only one more sector in addition to the current number of active sets, there is a possible problem that the terminal may not support all resources of the two sectors, allocated by the two base stations. In order to solve this problem, an embodiment of the present invention provides a scheme for sending a resource withdrawal request for a corresponding terminal to sectors and base stations, reception strengths of whose pilot channels are lowest, when the current number of active sets of the terminal is greater than or equal to the maximum number of active sets supportable by the terminal.

Figure 2:
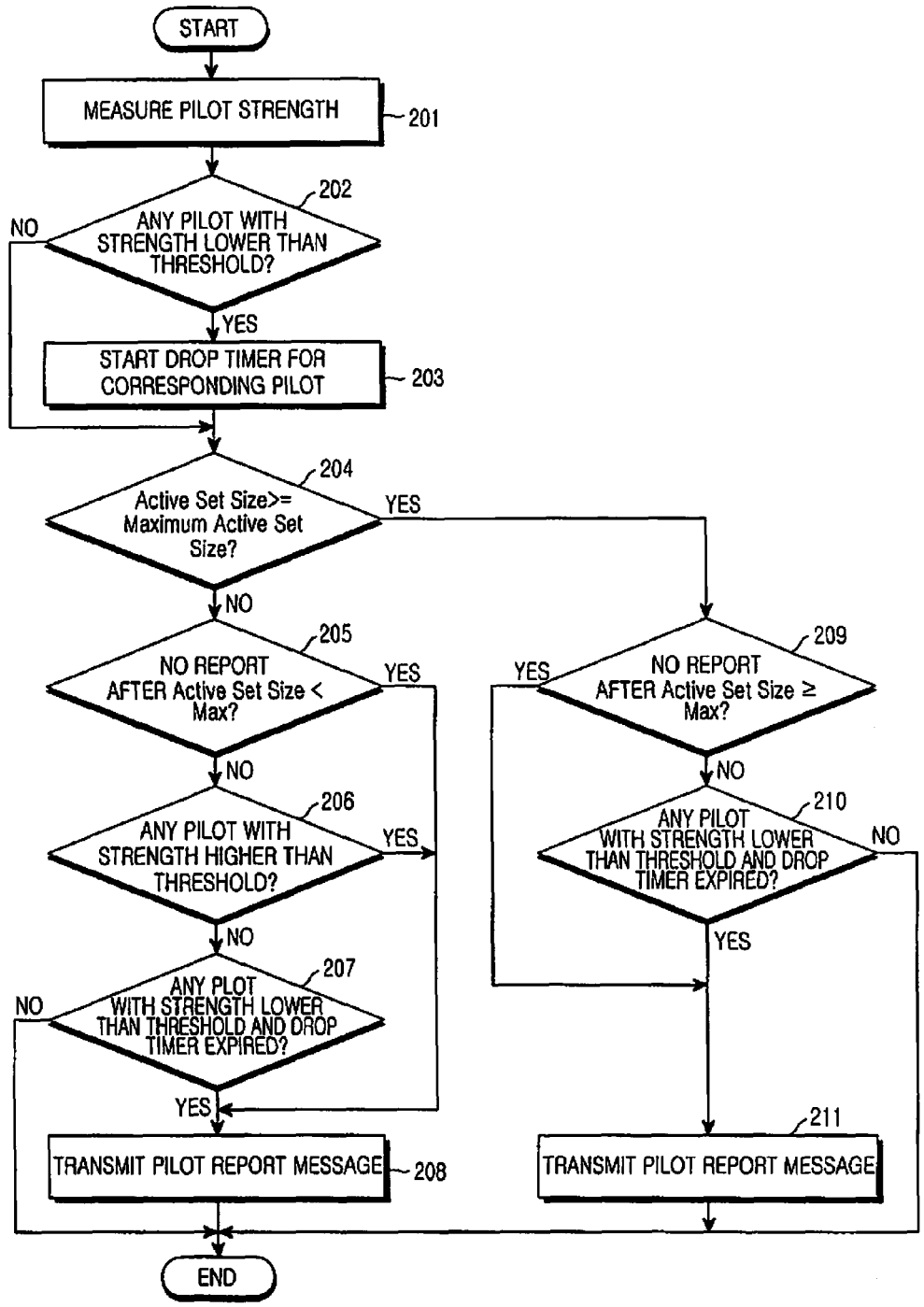
FIG. 2 is a flowchart illustrating a method for managing active sets in a terminal of a mobile communication system according to an embodiment of the present invention.

FIG. 2 is a flowchart illustrating a method for managing active sets in a terminal of a mobile communication system according to an embodiment of the present invention.

In step 201, a terminal measures reception strengths of pilot channels received at its current location. Thereafter, the terminal determines in step 202 whether there is any pilot whose reception strength has dropped below particular strength among the pilots included in the current active sets of the terminal. If it is determined in step 202 that there is no pilot whose reception strength has dropped below the particular strength, the terminal proceeds to step 204. However, if it is determined in step 202 that there is a pilot whose reception strength has dropped below the particular strength, the terminal starts a drop timer for the corresponding pilot in step 203.

In step 204, the terminal determines whether the current number (or 'active set size') of active sets of the terminal is greater than or equal to the maximum number (or 'maximum active set size') of active sets supportable by the terminal. If it is determined in step 204 that the current number of active sets of the terminal is less than the maximum number Max of supportable active sets, the terminal proceeds to step 205 where it determines whether there is no pilot report message transmitted up to now after the number of active sets of the terminal was decreased from the maximum number Max of supportable active sets.

If it is determined in step 205 that there a pilot report message has not been transmitted up to now after the number of active sets of the terminal was decreased from the maximum number Max of supportable active sets, the terminal proceeds to step 208 where it generates and transmits a pilot report message. However, if it is determined in step 205 that there is a pilot report message transmitted after the number of active sets was decreased from the maximum number Max of supportable active sets, the terminal proceeds to step 206 where it determines whether there is any pilot showing reception strength greater than or equal to particular strength among the pilots not included in active sets.

If it is determined in step 206 that there are pilots showing reception strengths greater than or equal to the particular strength among the pilots not included in the active sets, the terminal proceeds to step 208 where it generates and transmits a pilot report message. However, if it is determined in step 206 that there is no pilot showing reception strength greater than or equal to the particular strength among the pilots not included in the active sets of the terminal, the terminal determines in step 207 whether there is any pilot whose reception strength has dropped below particular strength among the pilots included in the active sets of the terminal and a drop timer has expired for the corresponding pilot. If the condition of step 207 is satisfied, the terminal proceeds to step 208 where it generates and transmits a pilot report message. However, if the condition of step 207 is not satisfied, the terminal transmits no pilot report message.

The pilot report message generated in step 208 may include a pilot showing reception strength higher than or equal to particular strength among the pilots not included in the active sets of the terminal, and/or a pilot whose reception strength has dropped below the particular strength among the pilots included in the active sets of the terminal. In addition, the pilot report message, as in an embodiment of the present invention, can further include information on the current number of active sets of the terminal and/or additional information on the number of supportable active sets, before being transmitted. Also, the pilot report message can be transmitted along with a resource withdrawal request for pilots (i.e., sectors or base stations) whose reception strengths are lowest among the pilots belonging to the active sets of the terminal.

Meanwhile, if it is determined in step 204 that the current number of active sets of the terminal is greater than or equal to the maximum number Max of active sets supportable by the terminal, the terminal proceeds to step 209 where it determines whether there is no pilot report message transmitted up to now after the number of active sets of the terminal was increased from or is equal to the maximum number Max of supportable active sets. If it is determined in step 209 that there is a pilot report first transmitted after the number of active sets of the terminal was increased from or is equal to the maximum number Max of supportable active sets, the terminal proceeds to step 211 where it generates and transmits a pilot report message. However, if the condition of step 209 is not satisfied, the terminal determines in step 210 whether there is any pilot whose reception strength has dropped below the particular strength among the pilots included in the active sets of the terminal and a drop timer has expired for the corresponding pilot. If the condition of step 210 is satisfied, the terminal proceeds to step 211 where it generates and transmits a pilot report message. However, if the condition of step 210 is not fully satisfied, the terminal does not transmit a pilot report message.

The pilot report message generated in step 211 may include a pilot showing reception strength greater than or equal to the particular strength among the pilots not included in the active sets of the terminal and/or a pilot whose reception strength has dropped below the particular strength among the pilots included in the active sets of the terminal. In addition, the pilot report message, as in an embodiment of the present invention, can further include information on the current number of active sets of the terminal and/or additional information on the number of supportable active sets, before being transmitted. Also, the pilot report message can be transmitted along with a resource withdrawal request for pilots (i.e., sectors or base stations) whose reception strengths are lowest among the pilots belonging to the active sets of the terminal.

Table 1 below shows an example of a pilot report message of an embodiment of the present invention.

TABLE 1

| Field | Length (bits) |
| --- | --- |
| MessageID | 8 |
| MessageSequence | 8 |
| ReferencePilotID | 10 |
| ReferencePilotStrength | 6 |
| ReferencePilotRemove | 1 |
| NumSupportableActivePilots | 4 |
| NumPilots | 6 |
| PilotID | 10 |
| ChannelBandIncluded | 1 |
| ChannelBand | variable |
| PilotStrength | 6 |
| PilotRemove | 1 |

A MessageID field is a field indicating an identifier used for distinguishing the pilot report message from another message, and a MessageSequence field is sequence information used for distinguishing a preceding/succeeding relation between different pilot report messages. A ReferencePilotID field is a field indicating an identifier of a pilot that the terminal has used as a reference to measure timing difference among pilots included in the pilot report message, and a ReferencePilotStrength field is a field indicating strength of a reference pilot. A ReferencePilotRemove field means that the terminal has removed a reference pilot from an active set of the terminal, or means that the terminal desires to remove a reference pilot from the active set. A NumSupportableActivePilots field is a field indicating the number of pilots with which the terminal can additionally include a particular base station or all base stations in the active set, and a NumPilots field is a field indicating the number of pilots included in the pilot report message. A PilotID field is a field indicating an identifier of a particular pilot included in the pilot report message. A ChannelBandIncluded field is a field indicating whether a ChannelBand field is included in the pilot report message, and the ChannelBand field is a field indicating information on a frequency channel over which strength information of a pilot indicated by the PilotID field is received. A PilotStrength field is a field indicating strength of a pilot indicated by the PilotID field. A PilotRemove field means that the terminal has removed a pilot indicated by the PilotID field from the active set, or means that the terminal desires to remove a pilot indicated by the PilotID field from the active set.

Figure 3:
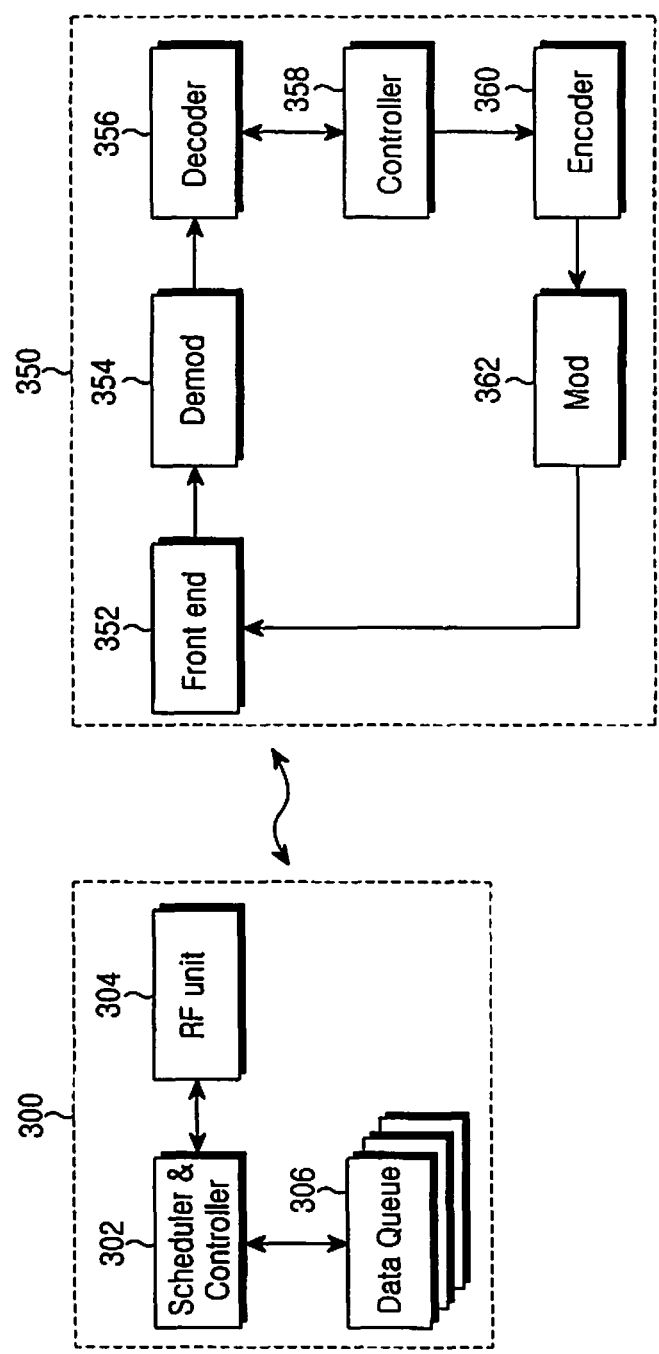
FIG. 3 is a block diagram illustrating apparatuses of a terminal and a base station according to an embodiment of the present invention.

FIG. 3 is a block diagram illustrating apparatuses of a terminal and a base station according to an embodiment of the present invention.

A base station apparatus 300 manages active sets for a terminal apparatus 350, and allocates wire/wireless resources to the corresponding terminal apparatus 350. The base station apparatus 300 includes a scheduler & controller 302, a Radio Frequency (RF) unit 304, and a data queue 306.

Meanwhile, the terminal apparatus 350 receives pilot channels transmitted by several base stations and sectors, reports corresponding information to the base station apparatus 300 according to the method of an embodiment of the present invention, and collectively manages the active sets allocated by the several base stations. The terminal apparatus 350 includes a front end (or transceiver unit) 352, a demodulator 354, a decoder 356, a controller 358, an encoder 360, and a modulator 362.

The scheduler & controller 302 of the base station apparatus 300 transmits/receives a pilot report message transmitted by the terminal apparatus 350 via the RF unit 304 according to an embodiment of the present invention. Further, the scheduler & controller 302 in the base station apparatus 300 determines whether to allocate wire/wireless resources to the terminal apparatus 350 using information on the number of active sets additionally supportable to the terminal apparatus 350 included in the received pilot report message. Moreover, the scheduler & controller 302 in the base station apparatus 300 determines resources it will allocate to the terminal apparatus 350 according to reception strength information of pilot channels and information on the current number of active sets, or information on the number of active sets additionally supportable by the terminal apparatus 350, all of which are included in the pilot report message received from the terminal apparatus 350.

The terminal apparatus 350 receives pilot channels transmitted by several base stations and sectors using the front end 352, the demodulator 354 and the decoder 356. The controller 358 of the terminal apparatus 350 determines whether to report pilot reception strength information to the base station apparatus 300 according to the method of an embodiment of the present invention using the reception strength information of the pilot channels, generates a pilot report message according to an embodiment of the present invention, and transmits the corresponding information to the base station apparatus 300 using the encoder 360, the modulator 362 and the front end 352. Further, the controller 358 of the terminal apparatus 350 collectively manages active sets allocated by several base stations according to the method proposed by an embodiment of the present invention.

The controller 358 of the terminal apparatus 350 compares the number of currently managed active sets with the predetermined maximum number Max of supportable active sets, and determines whether to transmit a pilot report message to the base station apparatus 300 according to the comparison result. In addition, the controller 358 can transmit the pilot report message to the base station apparatus 300 along with information on the number of active sets and/or information on the number of additionally supportable active sets.

In the embodiment of the present invention, if the number of currently managed active sets is greater than or equal to the predetermined maximum number Max of supportable active sets, the controller 358 of the terminal apparatus 350 transmits no pilot report message to the base station apparatus 300 even though signal strength of a pilot channel received from the base station apparatus 300 increases from a predetermined value.

Further, if the number of currently managed active sets is greater than or equal to the maximum number Max of supportable active sets and reception strength of a pilot channel included in the active sets is less than a predetermined threshold, the controller 358 transmits a pilot report message of the corresponding pilot channel to the base station apparatus 300.

If the number of active sets has become greater than or equal to the predetermined maximum number Max of supportable active sets in the state where it was previously less than the maximum number Max of supportable active sets, the controller 358 transmits a pilot report message to the base station apparatus 300.

However, if the number of active sets has become less than the predetermined maximum number Max of supportable active sets in the state where it was previously greater than or equal to the maximum number Max of supportable active sets, the controller 358 transmits a pilot report message to the base station apparatus 300.

As is apparent from the foregoing description, the present invention can efficiently manage active sets of the terminal in the mobile communication system.

Further, the present invention can efficiently manage active sets of the terminal in the distributed network structure where each base station independently stores and manages terminal-related information.

In addition, the present invention can efficiently allocate wireless resources to the terminal by the base station.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for managing active sets by a terminal that receives a pilot channel from a base station in a mobile communication system, the method comprising:

measuring reception strength of at least one of pilot channels;

determining whether a number of pilot channels that belong to the active sets being managed by the terminal is greater than or equal to a predetermined maximum number of supportable pilot channels;

transmitting a pilot report message, if the number of pilot channels that belong to the active sets currently being managed by the terminal is greater than or equal to the predetermined maximum number of supportable pilot channels and the reception strength is less than a particular strength; and preventing transmission of the pilot report message, if the number of pilot channels that belong to the active sets being managed by the terminal is greater than or equal to the predetermined maximum number of supportable pilot channels and the reception strength is greater than a predetermined value, wherein the active sets being managed by the terminal are independently assigned by a plurality of base stations; and wherein the terminal manages all active sets allocated from the plurality of base stations as a collective active set.

2. The method of claim 1, further comprising:

transmitting the pilot report message, when the number of pilot channels that belong to the active sets currently being managed by the terminal is greater than or equal to the predetermined maximum number of supportable pilot channels in a state where the number of pilot channels that belong to the active sets was previously less than the predetermined maximum number of supportable pilot channels.

3. The method of claim 1, further comprising:

transmitting the pilot report message, when the number of pilot channels that belong to the active sets currently being managed by the terminal is less than the predetermined maximum number of supportable pilot channels in a state where the number of pilot channels that belong to the active sets was previously greater than or equal to the predetermined maximum number of supportable pilot channels.

4. The method of claim 1, wherein the pilot report message comprises information on a number of pilot channels that belong to the active sets additionally supportable by the terminal.

5. The method of claim 4, wherein the pilot report message further comprises information indicating that the terminal has removed a particular pilot channel from active sets of the terminal.

6. The method of claim 5, wherein the pilot report message further comprises information indicating that the terminal desires to remove a particular pilot channel from the active sets.

7. The method of claim 6, wherein the pilot report message further comprises at least one of pilot information showing reception strength higher than or equal to a particular strength among pilot channels not included in the active sets of the terminal, and pilot information whose reception strength has dropped below particular strength among pilot channels included in the active sets of the terminal.

8. An apparatus for managing active sets of a terminal in a mobile communication system, the apparatus comprising:

a front end which receives at least one of pilot channels, and measuring reception strength of the at least one of pilot channels; and a controller which determines whether a number of pilot channels that belong to the active sets being managed by the terminal is greater than or equal to a predetermined maximum number of supportable pilot channels, and determining whether to transmit a pilot report message to the base station according to the determining result, wherein the controller transmits the pilot report message, when the number of pilot channels that belong to the active sets currently being managed by the terminal is greater than or equal to the predetermined maximum number of supportable pilot channels and the reception strength is less than a particular strength, wherein the controller prevents transmission of the pilot report message, if the number of pilot channels that belong to the active sets being managed by the terminal is greater than or equal to the predetermined maximum number of supportable pilot channels and the reception strength is greater than a predetermined value, wherein the active sets being managed by the terminal are independently assigned by a plurality of base stations, and wherein the terminal manages all active sets allocated from the plurality of base stations as collective active set.

9. The apparatus of claim 8, wherein the controller transmits the pilot report message, when the number of pilot channels that belong to the active sets currently being managed by the terminal is greater than or equal to the predetermined maximum number of supportable pilot channels in a state where the number of pilot channels that belong to the active sets was previously less than the predetermined maximum number of supportable pilot channels.

10. The apparatus of claim 8, wherein the controller transmits the pilot report message, when the number of pilot channels that belong to the active sets currently being managed by the terminal is less than the predetermined maximum number of supportable pilot channels in a state where the number of pilot channels that belong to the active sets was previously greater than or equal to the predetermined maximum number of supportable pilot channels.

11. The apparatus of claim 8, wherein the pilot report message comprises information on a number of pilot channels that belong to the active sets additionally supportable by the terminal.

12. The apparatus of claim 11, wherein the pilot report message further comprises information indicating that the terminal has removed a particular pilot channel from active sets of the terminal.

13. The apparatus of claim 12, wherein the pilot report message further comprises information indicating that the terminal desires to remove a particular pilot channel from the active sets.

14. The apparatus of claim 13, wherein the pilot report message further comprises at least one of pilot information showing reception strength greater than or equal to a particular strength among pilot channels not included in the active sets of the terminal, and pilot information whose reception strength has dropped below particular strength among pilot channels included in the active sets of the terminal.

* * * * *